US007623641B2

(12) United States Patent
Lee

(10) Patent No.: US 7,623,641 B2
(45) Date of Patent: Nov. 24, 2009

(54) AUDIO COMMUNICATION UNIT

(76) Inventor: Joseph C. Lee, 670 Parkridge Ave., Riverside, CA (US) 92879

( * ) Notice: Subject to any disclaimer, the term of this patent is extended or adjusted under 35 U.S.C. 154(b) by 1129 days.

(21) Appl. No.: 11/018,683

(22) Filed: Dec. 22, 2004

(65) Prior Publication Data

US 2006/0133627 A1 Jun. 22, 2006

(51) Int. Cl.
*H04M 1/60* (2006.01)
*H04M 9/00* (2006.01)

(52) U.S. Cl. .................................................. 379/167.14

(58) Field of Classification Search ............. 379/167.14
See application file for complete search history.

(56) References Cited

U.S. PATENT DOCUMENTS 4,049,911 A * 9/1977 Schlaff et al. .......... 379/420.03
5,706,344 A * 1/1998 Finn ...................... 379/406.09
5,940,486 A * 8/1999 Schlaff .................. 379/388.01
6,324,261 B1 * 11/2001 Merte .......................... 379/68
2004/0001141 A1 * 1/2004 Schlaff ....................... 348/143

* cited by examiner

*Primary Examiner*—Alexander Jamal
(74) *Attorney, Agent, or Firm*—John K. Park; Park Law Firm

(57) ABSTRACT

A voice communication unit for communicating though a barrier includes an outer audio unit including an outer voice sensing device and an outer voice reproducing device, an inner audio unit including an inner voice sensing device and an inner voice reproducing device, and a signal processing unit which connects the inner/outer audio units and includes a extraneous-sound reducing unit. The input/output sound paths respectively from the outer voice sensing/reproducing devices are separated by a predetermined distance to minimize the interference. In addition to the noise elimination, the invention provides a voice communication unit with weatherproofness by adjusting the size of and disposing the openings for the sound paths. The voice communication unit can be adapted to a two-way communication channel that carry information in both directions, but not at the same time, or to a two-way communication channel that carry information in both directions at the same time.

11 Claims, 8 Drawing Sheets

AUDIO COMMUNICATION UNIT

BACKGROUND OF THE INVENTION

The invention is related to a voice communication unit for communicating through a barrier. More particularly, the invention is related to a voice communication unit that can minimize the interference of the two different sound paths. The invention is also related to a voice communication unit, which can be adapted to a two-way communication channel that carry information in both directions, but not at the same time, or to a two-way communication channel that can carry information in both directions at the same time.

Conventionally, voice communication devices had problems in communicating through a barrier. At each end of the voice communication unit, there are a lot of interferences between the input sound and the output sound. The interferences are so omnipresent and troublesome that full duplex communication, a two-way communication channel that can carry information in both directions at the same time, through the sound barrier cannot be achieved in some environments stricken with undesirable sound sources all around. In some business fields providing a medical, financial, or governmental service, however, the full duplex communication unit through a sound barrier is indispensable. Furthermore, the modern industrialized society, full of countless electronic or electromechanical devices producing beeping/clicking sounds, requires a good method, electronic or acoustic, to reduce the noise significantly in order to make communication possible.

Accordingly, a need for a voice communication unit for communicating through a sound barrier has been with us for a long time. This invention is directed to solve these problems and satisfy the long-felt need.

SUMMARY OF THE INVENTION

In viewing of the background of the invention in the above, the object of the invention is to provide a voice communication unit for communicating though a barrier, which works satisfactorily in demanding acoustic environments.

Another object of the invention is to provide a voice communication unit for communicating through a barrier, which minimizes the interference between the input sound and the output sound. To achieve this object, an acoustic consideration in designing the communication unit is required.

Still another object of the invention is to provide a voice communication unit for communicating through a barrier, which includes a signal processing unit with a extraneous-sound reducing device. The undesirable noise entering into the system is eliminated further by the signal processing unit.

To achieve the above objects, the present invention provides a voice communication unit for communicating through a barrier that includes an outer audio unit incorporating a voice sensing device, a voice reproducing device, an inner audio unit incorporating a voice sensing device and a voice reproducing device, a signal processing unit which connects the outer audio unit and the inner audio unit, and a extraneous-sound reducing unit.

In the voice communication unit, the outer audio unit further incorporates an input sound path through which the sound entering the outer audio unit is guided to the outer voice sensing device, and an output sound path through which sound is guided from the outer voice reproducing device to the outside of the outer audio unit. The input sound path is separated from the output sound path by a predetermined distance, preferably at least 2 inches.

In an embodiment of the invention, the outer audio unit further includes a first case enclosing the outer voice reproducing device and a second case enclosing the voice sensing device. The first case has a cylindrical wall. The output sound path includes one or more holes provided in the cylindrical wall, and the input sound path protrudes beyond the first case and includes an opening provided on the second case, which is positioned around the center of the first case. The second case has a substantially cylindrical shape, and the opening leads to the periphery of the second case.

The input sound path includes a first sound tunnel connected with the opening and may further include a second sound tunnel connected obliquely to the first sound tunnel. The opening for the outer voice reproducing device is small enough to be blocked by a drop of water through surface tension when exposed to wet conditions.

The inner audio unit further includes an input sound path through which the sound from the outside of the outer audio unit is guided to the outer voice sensing device and an output sound path through which sound is guided from the outer voice reproducing device to the outside of the outer audio unit. The input sound path is separated from the output sound path by a predetermined distance.

In another embodiment of the invention, the outer audio unit includes a housing. The housing includes a first side portion, a second side portion, and a front portion. The first side portion is connected with the front portion on one end and the front portion is connected with the second side portion on the other end. The output sound path includes one or more holes provided on the first side portion, and the input sound path includes an opening provided on the front portion close to the second side portion.

In all these embodiments of the voice communication unit, the signal processing unit is a digital signal processing unit and the extraneous-sound reducing unit includes a unit for reducing acoustic echo and howling and a unit for reducing line noise.

The voice communication unit can be adapted to a two-way communication channel that can carry information in both directions, but not at the same time, or a two-way communication channel that can carry information in both directions at the same time.

Many other innovations, features, and advantages will be evident with the following description of the invention.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figures 1, 2, 3, 4:
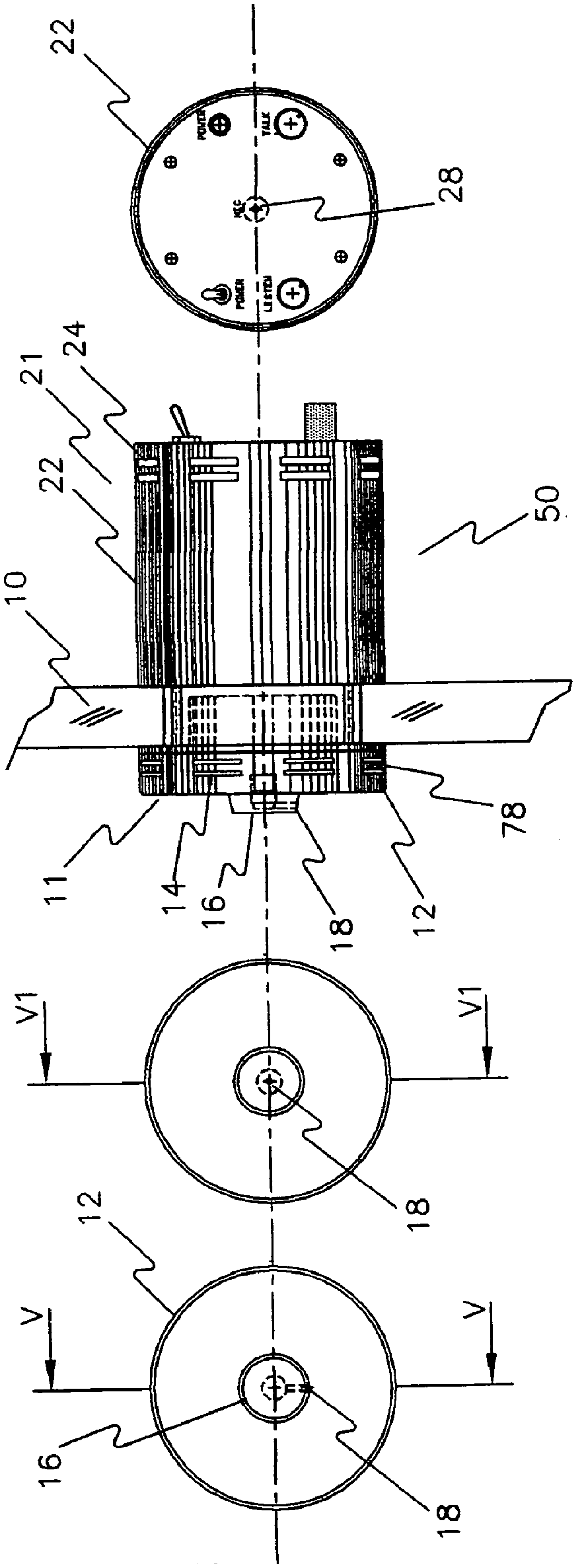
FIG. 1 is a front elevation view of an outer audio unit according to a first embodiment of the invention.
FIG. 2 is a front elevation view of another outer audio unit according to a first embodiment of the invention.
FIG. 3 is a side view of a voice communication unit of the invention.
FIG. 4 is a front elevation view of an inner audio unit.

FIGS. 1 through 4 show the schematic appearance of a voice communication unit 50 according to the first embodiment of the invention. A sound barrier 10 divides the voice communication unit 50 into two parts; an outer audio unit 11 and an inner audio unit 21.

Figure 7:
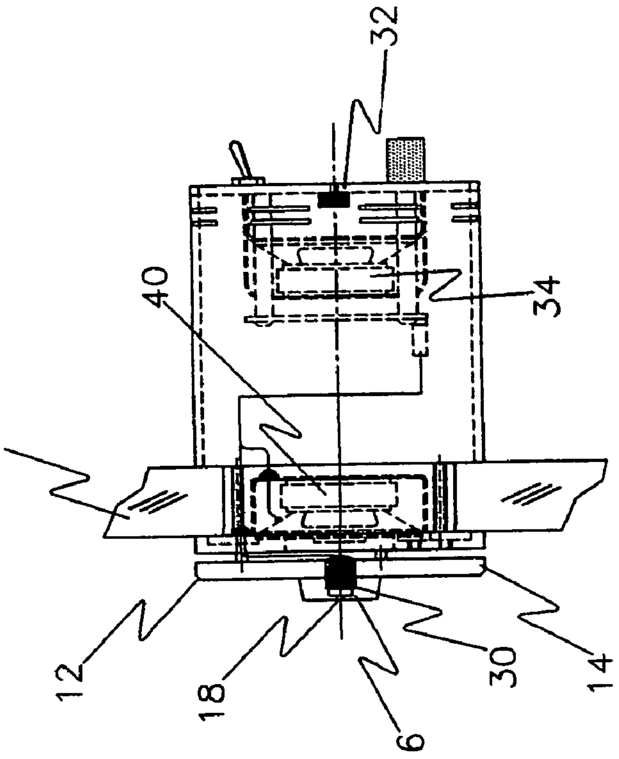
FIG. 7 is a cross-sectional view of FIG. 3.
Figure 6:
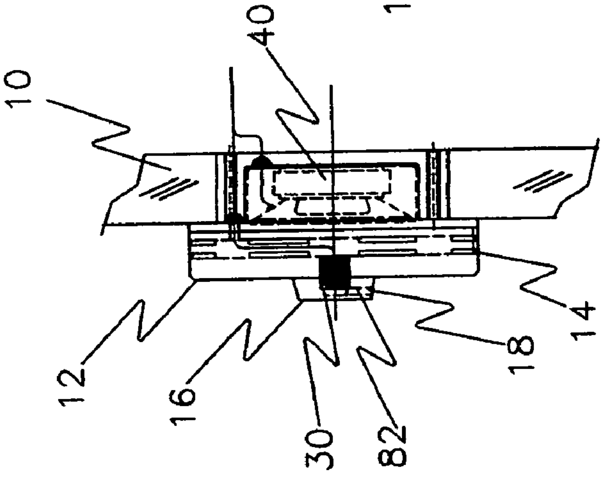
FIG. 6 is a cross-sectional view similar to FIG. 5 with a microphone positioned in a different position.
Figure 5:
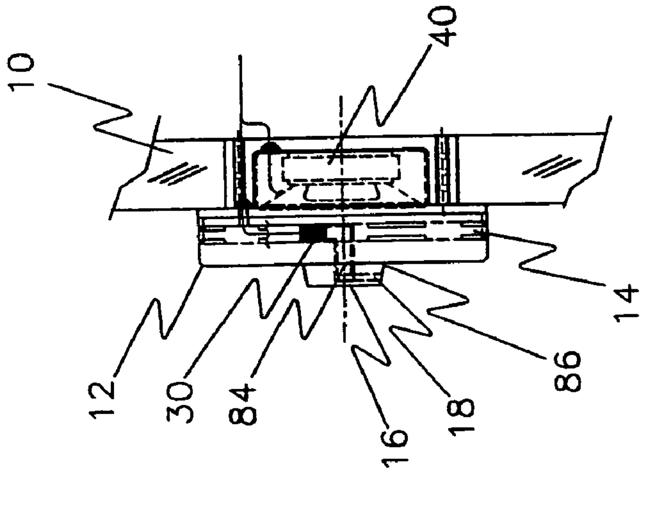
FIG. 5 is a cross-sectional view taken along V-V in FIG. 1.

In FIGS. 5 through 7, a outer voice sensing device 30 and an outer voice reproducing device 40 are shown.

As shown in the first embodiment of the invention, the voice communication unit 50 for communicating through a sound barrier 10 includes the outer audio unit 11 including the outer voice sensing device 30 and the outer voice reproducing device 40, the inner audio unit 21 including an inner voice sensing device 32 and an inner voice reproducing device 34, a signal processing unit 36 which connects the outer audio unit 11 and the inner audio unit 21. The signal processing unit 36 includes an extraneous-sound reducing unit 38. The extraneous-sound reducing unit 38 eliminates the undesirable sound such as acoustic echo, howling, or line noise.

To provide the voice communication unit 50 for communicating through a sound barrier 10, which works satisfactorily in demanding situations, one of the first concerns is to minimize the interference between the input sound to the outer voice sensing device 30 and the output sound from the outer voice reproducing device 40 especially in the outer audio unit 11, since the environment around the outer audio unit 11 is usually much worse in that region. That is, an acoustic consideration in designing the communication unit is required.

The major sources of interference-inducing sounds are feedback of the output sound 64 to the input sound 62 and far field echoes 66 from the surrounding environment.

As for the feedback of the output sound 64 to the input sound 62, the disposition of an opening 18' for the outer voice sensing device 30 and openings 14 for the outer voice reproducing device 40 is critical.

The runaway positive feedback in electronic systems is called "howling". This occurs in public address systems when sound from the speaker reaches the microphone, is amplified by the system, and is then fed back into the system at even higher volume. Therefore, to minimize the feedback of the output sound from the speaker, a voice reproducing device, into the microphone, a voice sensing device, is important to subdue this howling noise.

The outer audio unit 11 further includes an input sound path 72 through which the sound from the outside of the outer audio unit 11 is guided to the outer voice sensing device 30, and an output sound path 74 through which sound is guided from the outer voice reproducing device 40 to the outside of the outer audio unit 11. The input sound path 72 leads to the opening 18' and the output sound path 74 starts from the openings 14. In order to minimize the interference, the input sound path 72 must be separated from the output sound path 74 by a predetermined distance, preferably at least 2 inches.

The outer audio unit 11 includes a first case 12 enclosing the outer voice reproducing device 40 and a second case 16 enclosing the voice sensing device 30. The first case 12 has a cylindrical wall 78. The output sound path 74 includes one or more holes 14 provided on the cylindrical wall 78. The input sound path 72 protrudes beyond the first case 12 and includes an opening 18 provided on the second case 16 and positioned around the center of the first case 12. Also, the second case 16 has a substantially cylindrical shape, and the opening 18 can lead to the periphery of the second case 16.

Still in FIGS. 1 through 7, the input sound path 72 further includes a first sound tunnel 82 connected with the opening 18, and a second sound tunnel 84 connected obliquely to the first sound tunnel 82.

Since the outer region can be exposed to outdoors or weather challenging conditions, the opening 18 or 18' needs to be small enough to be blocked by a drop of water through surface tension when exposed to wet condition. When installed, the opening 18 opens in the direction of gravity to keep the water drops from creeping into the first sound tunnel 82 enhancing the weather resistance. It is also for tamper proofing.

Figure 8:
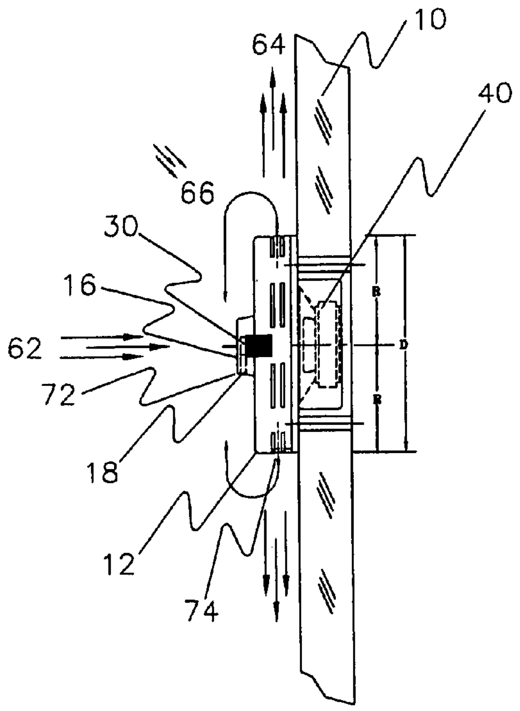
FIG. 8 is a schematic side elevation view of the outer audio unit showing sound-propagating lines.
Figure 9:
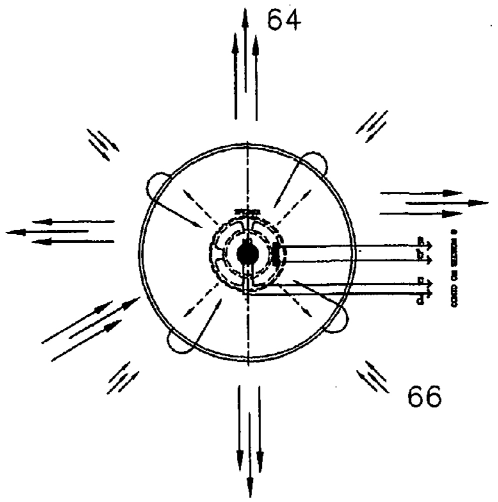
FIG. 9 is a schematic front elevation view of the outer audio unit showing sound-propagation lines.
Figure 10:
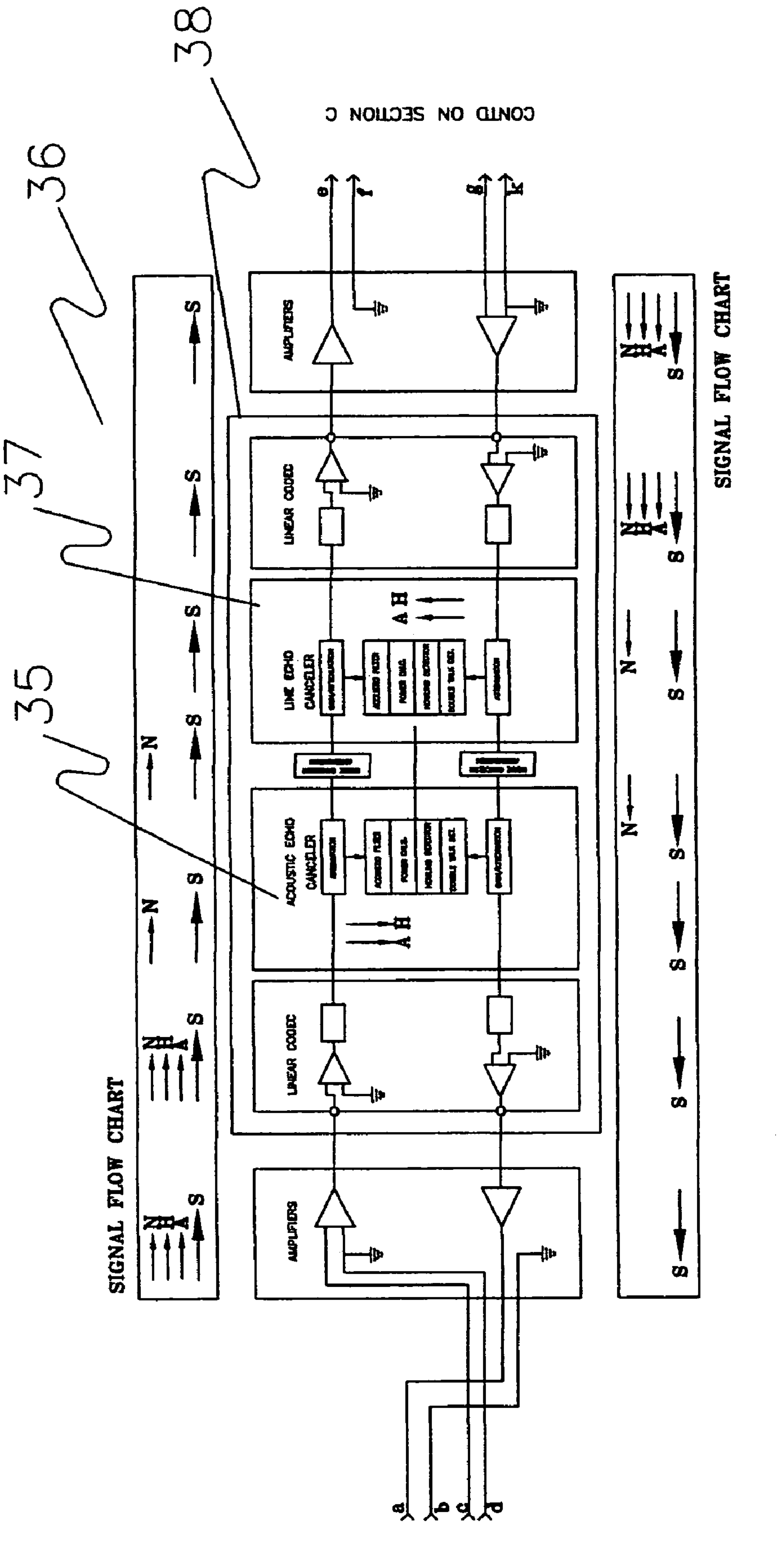
FIG. 10 is a schematic diagram of a signal processing unit.

As for the far field echoes 66 from the surroundings shown in FIGS. 8 and 9, it should be eliminated by using a signal processing unit 36 as shown in FIG. 10. The signal processing unit 36 is usually a digital signal processing unit. The signal processing unit 36 includes an extraneous-sound reducing unit 38 including a unit 35 for reducing acoustic echo and howling and a unit 37 for reducing line noise. The extraneous noise entering the system is eliminated by the digital signal processing unit as shown in the signal flow chart in FIG. 10. The extraneous-sound reducing unit 38 eliminates the noise intrinsically present along the electronic circuit, which is called line noise in the diagram, as well as the acoustic echo and the howling. Usually, the noise in practice can be "white", having equal power in a given bandwidth at any centre frequency, with a flat spectrum over a defined frequency band. Therefore, the white noise can be removed reasonably easily by a filter. The signal processing unit 36 also eliminates the howling noise generated by the feedback of the output sound to the voice sensing device 30 which was not eliminated completely by the acoustic design of the system.

Figure 12:
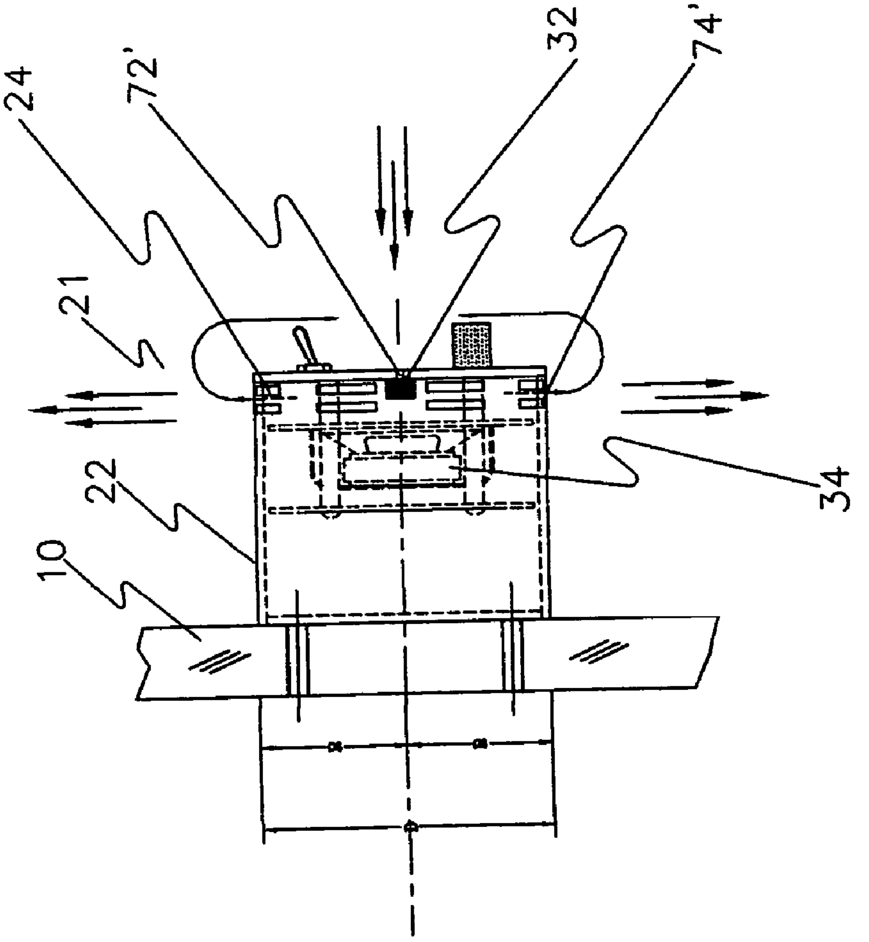
FIG. 12 is a side elevation view of the inner audio unit.
Figure 11:
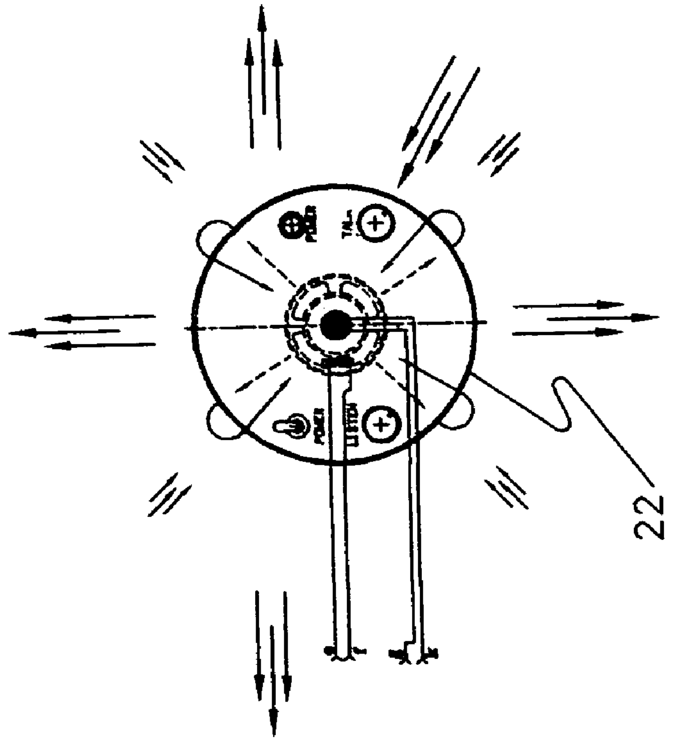
FIG. 11 is a front elevation view of the inner audio unit.

Also, on the other side, the inner audio unit 21 includes an input sound path 72' through which the sound from the outside of the inner audio unit 21 is guided to the inner voice sensing device 32 and an output sound path 74' through which sound is guided from the inner voice reproducing device 34 to the outside of the inner audio unit 21, and the input sound path 72' is isolated from the output sound path 74' as shown in FIG. 11 and FIG. 12.

Figure 14:
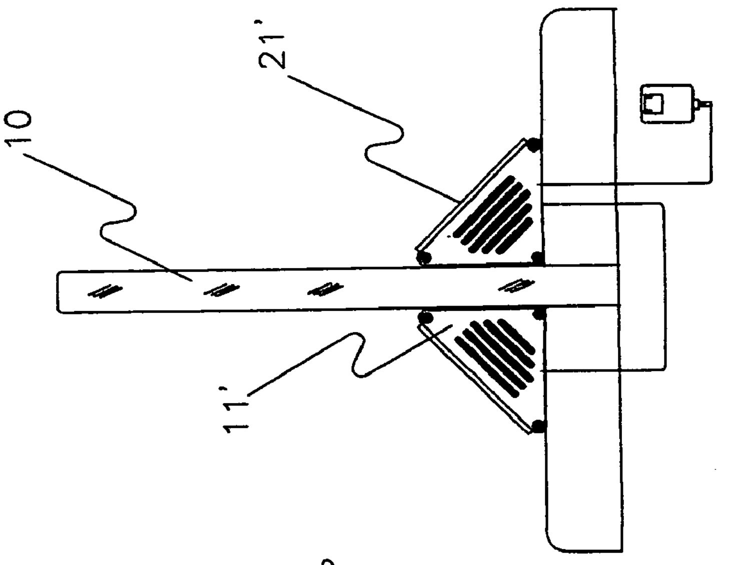
FIG. 14 is a side elevation view of the second embodiment of the invention.
Figure 13:
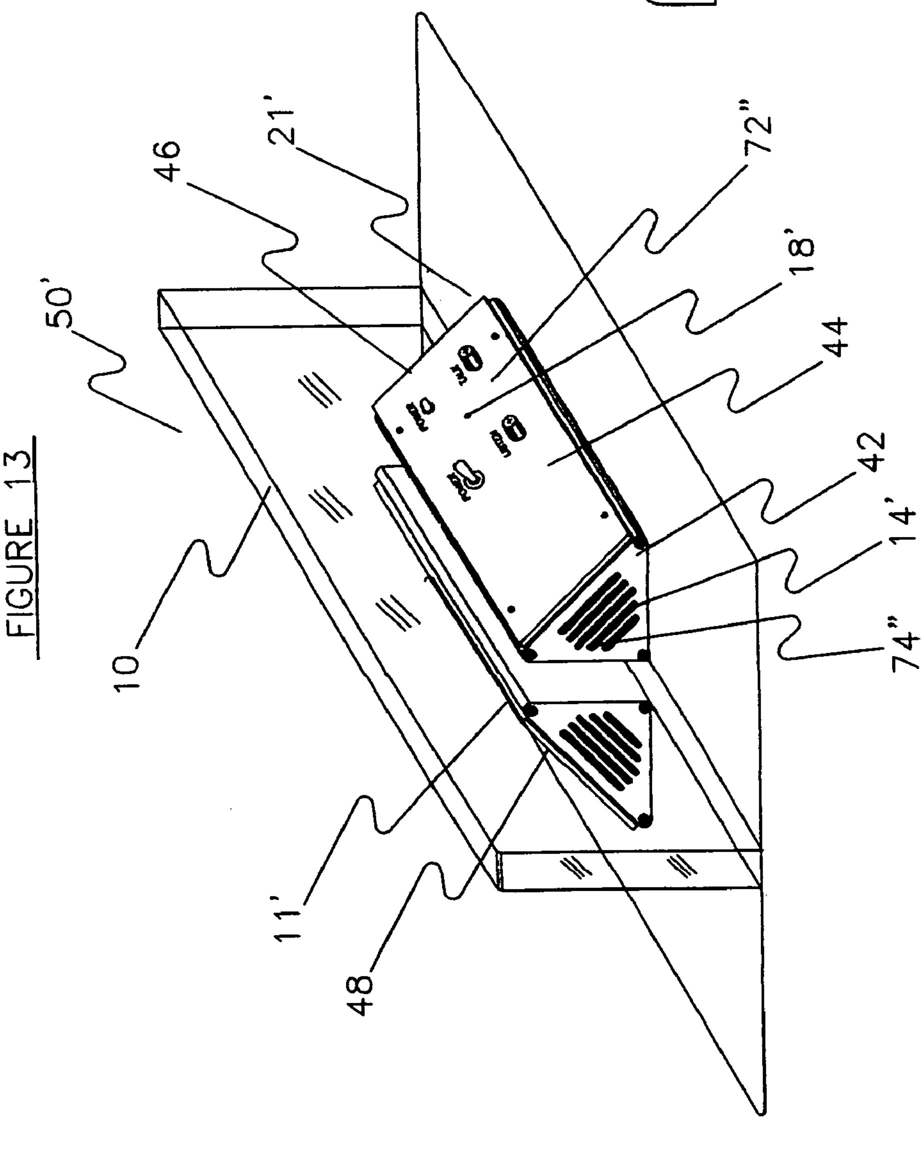
FIG. 13 is a illustrative perspective view of a second embodiment of the invention.
Figure 15:
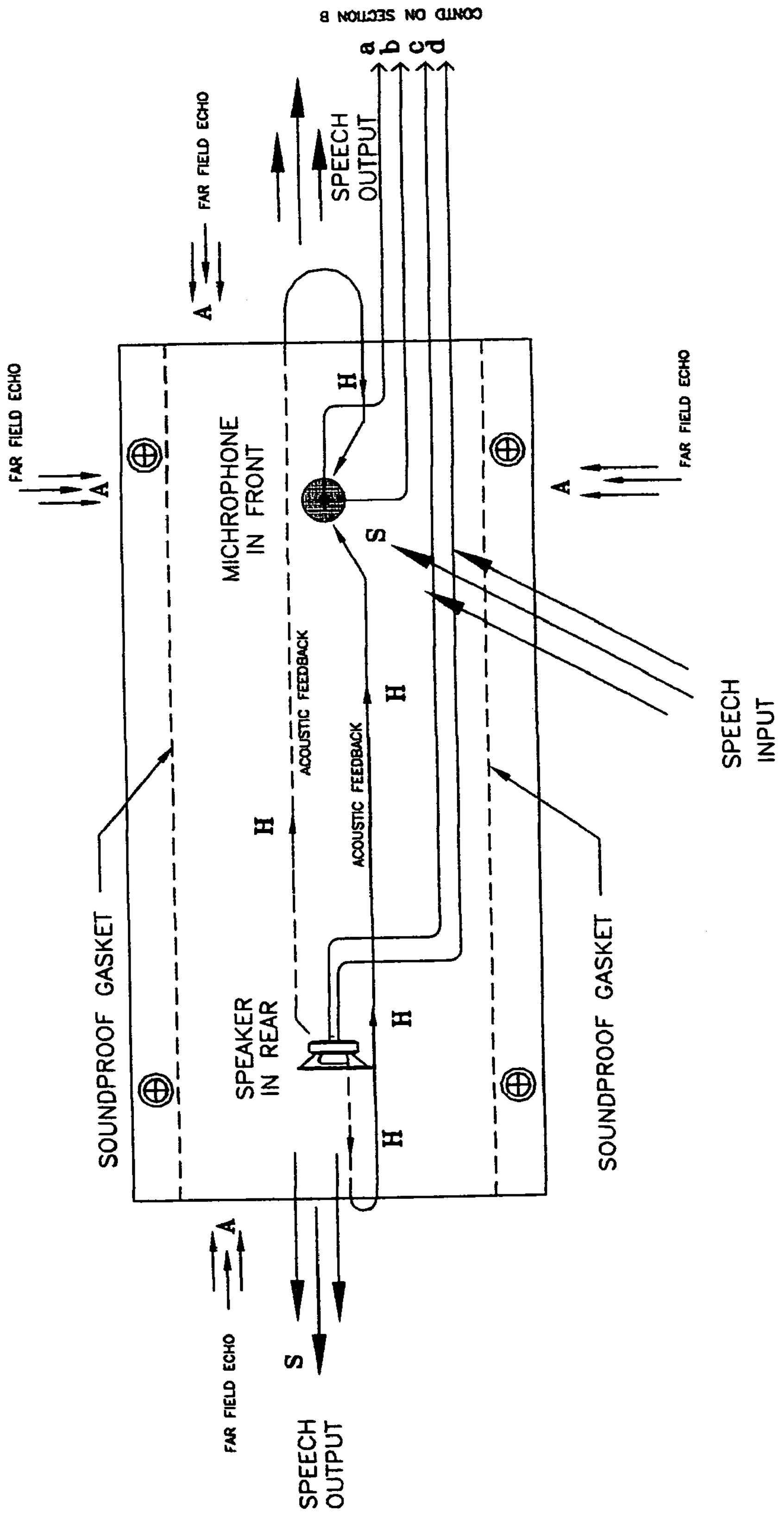
FIG. 15 is a schematic view of the second embodiment of the invention showing an input sound path and an output sound path in the outer audio unit.
Figure 16:
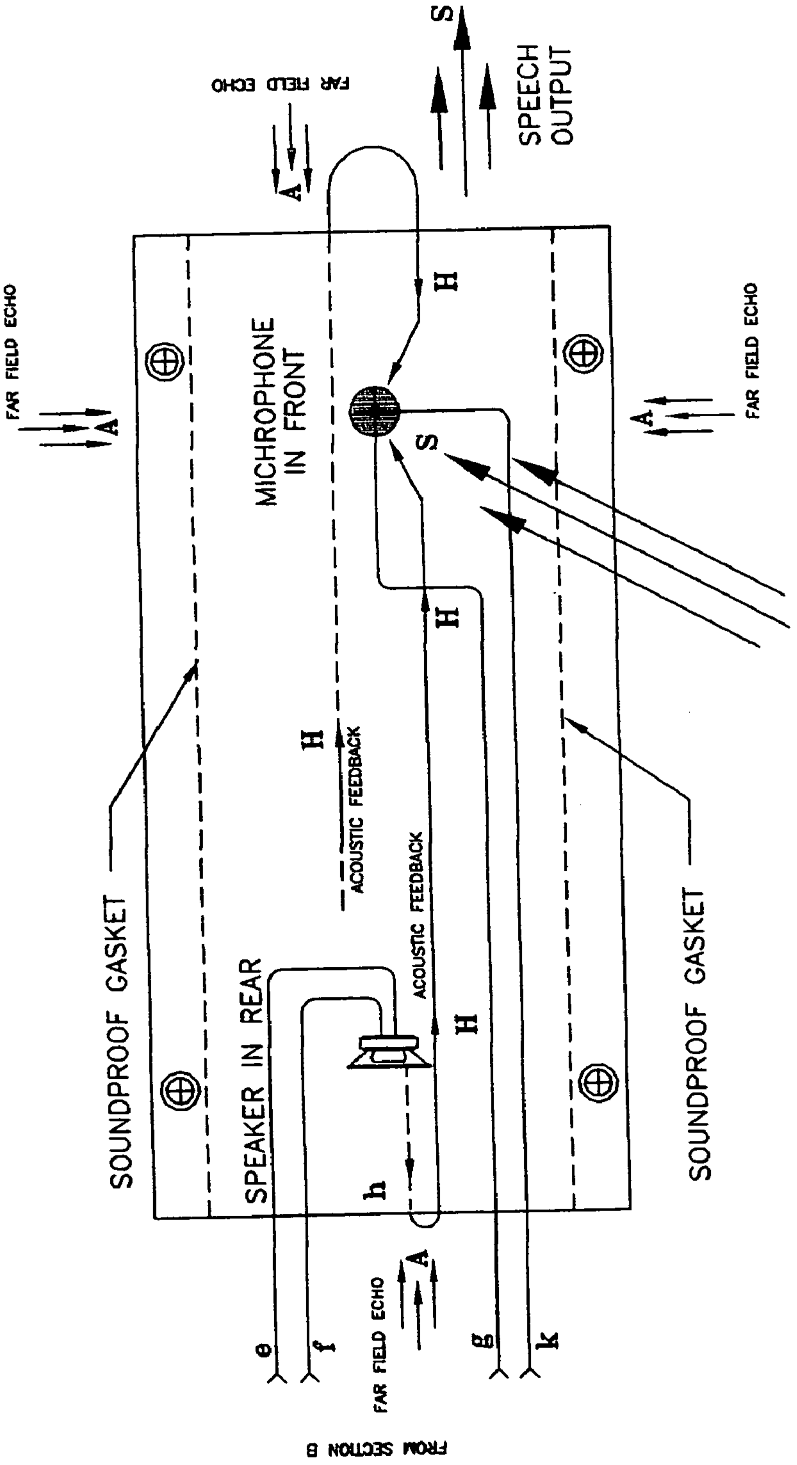
FIG. 16 is a plan view of another embodiment of the invention showing the input sound path and the output sound path in the inner audio unit.

In another embodiment of the voice communication unit 50' as shown in FIG. 13 and FIG. 14, the outer audio unit 11' has a housing 48, and the housing 48 includes a first side portion 42, a second side portion 46, and a front portion 44, wherein the first side portion 42 is connected with the front portion 44 on one end and the front portion 44 is connected with the second side portion 46 on the other end. The output sound path 74" includes one or more holes or slots 14' provided on the first side portion 42, and the input sound path 72" includes an opening 18' provided on the front portion 44 close to the second side portion 46.

The voice communication unit 50 can be adapted to a two-way communication channel that can carry information in both directions, but not at the same time, which is called a half duplex channel. Also, the voice communication unit 50 is adapted to a two-way communication channel that can carry information in both directions at the same time, which is called a full duplex channel.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A voice communication unit for communicating through a sound barrier, comprising:

an outer audio unit comprising an outer voice sensing device and an outer voice reproducing device, wherein the outer audio unit further comprise an input sound path through which the sound from the outside of the outer audio unit is guided to the outer voice sensing device, and an output sound path through which sound is guided from the outer voice reproducing device to the outside of the outer audio unit, wherein the input sound path is isolated from the output sound path, wherein the input sound path is separated from, the output sound path by at least about two (2) inches, wherein the outer audio unit further comprises a first case enclosing the outer voice reproducing device and a second case enclosing the voice sensing device, wherein the first case comprises a cylindrical wall, wherein the output sound path comprises one or more slotted openings provided on the cylindrical wall, wherein the input sound path protrudes beyond the first case, where in the input sound path comprises an opening provided on the second case, wherein the opening is positioned around the center of the first case, and wherein the second case has a substantially cylindrical shape, and the opening is provided on the periphery of the second case;

an inner audio unit comprising an inner voice sensing device and an inner voice reproducing device; and a signal processing unit which connects the outer audio unit and the inner audio unit, wherein the signal processing unit comprises an extraneous-sound reducing unit.

2. The voice communication unit according to claim 1, wherein the input sound path further comprises a first sound tunnel connected with the opening.

3. The voice communication unit according to claim 2, wherein the input sound path further comprises a second sound tunnel connected obliquely to the first sound tunnel.

4. The voice communication unit according to claim 1, wherein the opening is small enough to be blocked by a drop of water through surface tension when exposed to wet conditions.

5. A voice communication unit for communicating through a sound barrier, comprising:

an outer audio unit comprising an outer voice sensing device and an outer voice reproducing device, wherein the outer audio unit the r comprise an input sound path through which the sound from the outside of the outer audio unit is guided to the outer voice sensing device, and an output sound path through which sound is guided from the outer voice reproducing device to the outside of the outer audio unit, wherein the input sound path is isolated from the output sound path;

an inner audio unit comprising an inner voice sensing device and an inner voice reproducing device; and a signal processing unit which connects the outer audio unit and the inner audio unit, wherein the signal processing unit comprises an extraneous-sound reducing unit, wherein the outer audio unit comprises a housing, wherein the housing comprises a first side portion, a second side portion, and a front portion, wherein the first side portion is connected with the front portion on one end and the front portion is connected with the second side portion on the other end, wherein the output sound path comprises one or more openings provided on the first side portion, wherein the inputs sound path comprises an opening provided on the front portion close to the second side portion.

6. The voice communication unit according to claim 5, wherein the output sound path comprises one or more openings provided on the first side portion.

7. The voice communication unit according to claim 1, wherein the extraneous-sound reducing unit comprises a unit for reducing acoustic echo and howling.

8. The voice communication unit according to claim 7, wherein the extraneous-sound reducing unit further comprises a unit for reducing a line noise.

9. The voice communication unit according to claim 1, wherein the extraneous-sound reducing unit comprises a unit for reducing acoustic echo and howling and a unit for reducing a line noise.

10. The voice communication unit according to claim 9, wherein the voice communication unit is adapted to a two-way co communication channel that can carry information in both directions, but not at the same time.

11. The voice communication unit according to claim 10, wherein the voice communication unit is adapted to a two-way communication channel that can carry information in both directions at the same time.

* * * * *